(12) United States Patent
Colrain et al.

(10) Patent No.: US 7,664,847 B2
(45) Date of Patent: *Feb. 16, 2010

(54) MANAGING WORKLOAD BY SERVICE

(75) Inventors: Carol Colrain, Redwood Shores, CA (US); Daniel Semler, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 871 days.

This patent is subject to a terminal disclaimer.

(21) Appl. No.: 10/917,715

(22) Filed: Aug. 12, 2004

(65) Prior Publication Data

US 2005/0038833 A1 Feb. 17, 2005

Related U.S. Application Data

(60) Provisional application No. 60/495,368, filed on Aug. 14, 2003, provisional application No. 60/500,096, filed on Sep. 3, 2003.

(51) Int. Cl.
*G06F 15/173* (2006.01)

(52) U.S. Cl. .............. 709/224; 709/225; 709/226; 709/223

(58) Field of Classification Search ................ 709/224
See application file for complete search history.

(56) References Cited

U.S. PATENT DOCUMENTS

| | | |
|---|---|---|
| 2,883,255 A | 4/1959 | Anderson |
| 3,588,837 A | 6/1971 | Rash et al. |
| 5,548,539 A | 8/1996 | Vlach et al. |
| 5,600,791 A | 2/1997 | Carlson et al. |
| 5,721,825 A | 2/1998 | Lawson et al. |

(Continued)

FOREIGN PATENT DOCUMENTS

EP     0 750 256 A2    6/1996

(Continued)

OTHER PUBLICATIONS

International Searching Authority, "Notification of Transmittal of the International Search Report and the Written Opinion of the International Searching Authority, or the Declaration," Aug. 4, 2005, 13 pages.

(Continued)

*Primary Examiner*—Kenny S Lin
*Assistant Examiner*—Hieu T Hoang
(74) *Attorney, Agent, or Firm*—Hickman Palermo Truong & Becker LLP; Deborah L. Caswell

(57) ABSTRACT

Approaches for manage and measuring workload on computer resources by measuring workload in ways that are independent of physical hardware and that correlate to ways in which it is desirable to measure and manage workload for applications and clients. Specifically, logical abstractions of workload, referred to as services, are defined for a cluster of nodes running a multi-node database server of a database. A service is a category of work hosted on a subset of multi-node database servers, such as work that is performed for an online order entry application. The workload is measured and demarcated by the service no matter which node in a single or multi-node system performs the service, providing a global view of performance realized by the system.

20 Claims, 4 Drawing Sheets

U.S. PATENT DOCUMENTS

| | | | |
|---|---|---|---|
| 5,774,668 A | 6/1998 | Choquier et al. | |
| 5,890,167 A | 3/1999 | Bridge, Jr. et al. | |
| 5,918,059 A | 6/1999 | Tavallaei et al. | |
| 5,933,604 A | 8/1999 | Inakoshi | |
| 5,951,694 A | 9/1999 | Choquier et al. | |
| 6,041,357 A | 3/2000 | Kunzelman et al. | |
| 6,061,678 A | 5/2000 | Klein et al. | |
| 6,088,727 A | 7/2000 | Hosokawa et al. | |
| 6,088,728 A | 7/2000 | Bellemore et al. | |
| 6,105,067 A | 8/2000 | Batra | |
| 6,178,529 B1 | 1/2001 | Short et al. | |
| 6,192,401 B1 | 2/2001 | Modiri et al. | |
| 6,243,718 B1 | 6/2001 | Klein et al. | |
| 6,243,751 B1 | 6/2001 | Chatterjee et al. | |
| 6,266,666 B1 | 7/2001 | Ireland et al. | |
| 6,279,001 B1 | 8/2001 | DeBettencourt et al. | |
| 6,304,967 B1 | 10/2001 | Braddy | |
| 6,321,235 B1* | 11/2001 | Bird | 707/203 |
| 6,327,622 B1 | 12/2001 | Jindal et al. | |
| 6,353,898 B1 | 3/2002 | Wipfel et al. | |
| 6,415,333 B1 | 7/2002 | Vasell | |
| 6,438,705 B1 | 8/2002 | Chao et al. | |
| 6,453,314 B1 | 9/2002 | Chan et al. | |
| 6,466,949 B2 | 10/2002 | Yang et al. | |
| 6,556,659 B1 | 4/2003 | Bowman-Amuah | |
| 6,587,866 B1 | 7/2003 | Modi et al. | |
| 6,594,786 B1 | 7/2003 | Connelly et al. | |
| 6,601,101 B1 | 7/2003 | Lee et al. | |
| 6,718,394 B2 | 4/2004 | Cain | |
| 6,728,748 B1* | 4/2004 | Mangipudi et al. | 718/105 |
| 6,732,063 B2 | 5/2004 | Famili et al. | |
| 6,738,790 B1 | 5/2004 | Klein et al. | |
| 6,738,933 B2 | 5/2004 | Fraenkel et al. | |
| 6,801,949 B1 | 10/2004 | Bruck et al. | |
| 6,816,907 B1* | 11/2004 | Mei et al. | 709/229 |
| 6,925,477 B1 | 8/2005 | Champagne et al. | |
| 6,950,848 B1* | 9/2005 | Yousefi'zadeh | 709/203 |
| 6,952,766 B2 | 10/2005 | Dervin et al. | |
| 6,978,366 B1 | 12/2005 | Ignatchenko et al. | |
| 6,990,606 B2 | 1/2006 | Schroiff et al. | |
| 7,024,394 B1 | 4/2006 | Ashour et al. | |
| 7,039,654 B1* | 5/2006 | Eder | 707/104.1 |
| 7,058,957 B1 | 6/2006 | Nguyen | |
| 7,082,117 B2 | 7/2006 | Billhartz | |
| 7,093,250 B1 | 8/2006 | Rector | |
| 7,136,825 B2* | 11/2006 | Araki et al. | 705/9 |
| 7,174,379 B2* | 2/2007 | Agarwal et al. | 709/226 |
| 7,177,823 B2 | 2/2007 | Lam et al. | |
| 7,178,050 B2 | 2/2007 | Fung et al. | |
| 7,263,590 B1* | 8/2007 | Todd et al. | 711/165 |
| 7,269,157 B2 | 9/2007 | Klinker et al. | |
| 7,272,688 B1 | 9/2007 | Glasco | |
| 7,292,961 B2 | 11/2007 | Dias et al. | |
| 7,293,255 B2 | 11/2007 | Kumar | |
| 7,296,268 B2 | 11/2007 | Darling et al. | |
| 7,299,294 B1 | 11/2007 | Bruck et al. | |
| 7,346,744 B1 | 3/2008 | Glasco | |
| 7,349,980 B1 | 3/2008 | Darugar et al. | |
| 7,370,223 B2 | 5/2008 | Olmstead et al. | |
| 7,392,421 B1 | 6/2008 | Bloomstein et al. | |
| 7,395,187 B2 | 7/2008 | Duyanovich et al. | |
| 7,401,143 B2 | 7/2008 | Oulu et al. | |
| 7,406,631 B2 | 7/2008 | Moore | |
| 7,437,446 B2 | 10/2008 | Bailey et al. | |
| 7,447,693 B2 | 11/2008 | Wilding et al. | |
| 7,506,034 B2* | 3/2009 | Coates et al. | 709/219 |
| 7,512,686 B2* | 3/2009 | Berg | 709/227 |
| 2001/0027406 A1* | 10/2001 | Araki et al. | 705/8 |
| 2001/0056493 A1 | 12/2001 | Mineo | |
| 2002/0055982 A1 | 5/2002 | Goddard | |
| 2002/0073139 A1 | 6/2002 | Hawkins et al. | |
| 2002/0073354 A1 | 6/2002 | Schroiff et al. | |
| 2002/0078263 A1 | 6/2002 | Darling et al. | |
| 2002/0099598 A1 | 7/2002 | Eicher et al. | |
| 2002/0129146 A1 | 9/2002 | Aronoff et al. | |
| 2002/0129157 A1 | 9/2002 | Varsano | |
| 2002/0161896 A1 | 10/2002 | Wen et al. | |
| 2002/0194015 A1* | 12/2002 | Gordon et al. | 705/1 |
| 2002/0198883 A1 | 12/2002 | Nishizawa et al. | |
| 2002/0198984 A1 | 12/2002 | Goldstein et al. | |
| 2002/0198985 A1 | 12/2002 | Fraenkel et al. | |
| 2003/0005028 A1 | 1/2003 | Dritschler et al. | |
| 2003/0007497 A1 | 1/2003 | March et al. | |
| 2003/0037146 A1 | 2/2003 | O'Neill | |
| 2003/0039212 A1 | 2/2003 | Lloyd et al. | |
| 2003/0046298 A1 | 3/2003 | Weedon | |
| 2003/0063122 A1 | 4/2003 | Cichowlas et al. | |
| 2003/0065986 A1* | 4/2003 | Fraenkel et al. | 714/47 |
| 2003/0074475 A1 | 4/2003 | Ollikainen | |
| 2003/0088425 A1 | 5/2003 | Lam et al. | |
| 2003/0088671 A1 | 5/2003 | Klinker et al. | |
| 2003/0108052 A1 | 6/2003 | Inoue et al. | |
| 2003/0126240 A1 | 7/2003 | Vosseler | |
| 2003/0135609 A1 | 7/2003 | Carlson et al. | |
| 2003/0135642 A1 | 7/2003 | Benedetto et al. | |
| 2003/0149550 A1 | 8/2003 | Famili et al. | |
| 2003/0154398 A1 | 8/2003 | Eaton et al. | |
| 2003/0158951 A1 | 8/2003 | Primak et al. | |
| 2003/0167456 A1 | 9/2003 | Sabharwal | |
| 2003/0172145 A1* | 9/2003 | Nguyen | 709/223 |
| 2003/0204509 A1 | 10/2003 | Dinker et al. | |
| 2003/0208523 A1* | 11/2003 | Gopalan et al. | 709/201 |
| 2003/0229695 A1* | 12/2003 | Mc Bride | 709/224 |
| 2004/0024881 A1 | 2/2004 | Elving et al. | |
| 2004/0064548 A1 | 4/2004 | Adams et al. | |
| 2004/0078455 A1 | 4/2004 | Eide et al. | |
| 2004/0078602 A1 | 4/2004 | Rothbarth et al. | |
| 2004/0098490 A1 | 5/2004 | Dinker et al. | |
| 2004/0103195 A1 | 5/2004 | Chalasani et al. | |
| 2004/0111506 A1* | 6/2004 | Kundu et al. | 709/223 |
| 2004/0117375 A1* | 6/2004 | Saha et al. | 707/10 |
| 2004/0117794 A1* | 6/2004 | Kundu | 718/102 |
| 2004/0153708 A1 | 8/2004 | Joshi et al. | |
| 2004/0176996 A1* | 9/2004 | Powers et al. | 705/11 |
| 2004/0205101 A1 | 10/2004 | Radhakrishnan | 709/200 |
| 2004/0243699 A1 | 12/2004 | Koclanes et al. | 709/224 |
| 2004/0257985 A1* | 12/2004 | Sahai et al. | 370/229 |
| 2004/0268357 A1* | 12/2004 | Joy et al. | 718/105 |
| 2005/0021771 A1 | 1/2005 | Kaehn et al. | |
| 2005/0027858 A1 | 2/2005 | Sloth et al. | |
| 2005/0038280 A1 | 2/2005 | Chidambaran et al. | |
| 2005/0038833 A1 | 2/2005 | Colrain et al. | |
| 2005/0050116 A1* | 3/2005 | Gross et al. | 707/204 |
| 2005/0055383 A1 | 3/2005 | Dias et al. | |
| 2005/0086242 A1 | 4/2005 | Ngai et al. | |
| 2005/0086263 A1 | 4/2005 | Ngai et al. | |
| 2005/0120111 A1 | 6/2005 | Bailey et al. | |
| 2005/0132222 A1 | 6/2005 | Petrovic | |
| 2005/0165925 A1 | 7/2005 | Dan et al. | |
| 2005/0239476 A1 | 10/2005 | Betrabet et al. | |
| 2005/0251792 A1 | 11/2005 | Smith | |
| 2005/0267965 A1 | 12/2005 | Heller | |
| 2006/0036617 A1 | 2/2006 | Bastawala et al. | |
| 2006/0161816 A1 | 7/2006 | Gula et al. | |
| 2006/0195525 A1 | 8/2006 | Page et al. | |
| 2007/0226323 A1 | 9/2007 | Halpern | |
| 2008/0027769 A1* | 1/2008 | Eder | 705/7 |
| 2008/0209027 A1 | 8/2008 | Duyanovich et al. | |

FOREIGN PATENT DOCUMENTS

| | | |
|---|---|---|
| EP | 0 942 363 A2 | 9/1999 |
| EP | 0942363 | 9/1999 |
| EP | 0942363 A2 | 9/1999 |

| | | |
|---|---|---|
| EP | 0 992 909 A2 | 4/2000 |
| EP | 1 170 662 A2 | 1/2002 |
| EP | 1 260 902 A2 | 5/2002 |
| JP | 10-187638 | 7/1998 |
| WO | WO 02/00737 | 1/2002 |
| WO | WO 02/05116 A2 | 1/2002 |
| WO | WO 02/07037 | 1/2002 |
| WO | WO 02/07037 A1 | 1/2002 |
| WO | WO 03/014929 A1 * | 8/2002 |
| WO | WO 02/097676 A2 | 12/2002 |
| WO | WO 03/014928 | 2/2003 |
| WO | WO 03/014928 A1 | 2/2003 |
| WO | WO 03/014928 A2 | 2/2003 |
| WO | WO 03/048934 A2 | 6/2003 |
| WO | WO 03/062983 | 7/2003 |
| WO | WO 03/062983 A2 | 7/2003 |

OTHER PUBLICATIONS

Current Claims for International Application No. PCT/US2004/026389, pp. 1-7.
Jeffrey S. Chase et al., "Dynamic Virtual Clusters in a Grid Site Manager," Proceedings of the 12$^{th}$ IEEE International Symposium on High Performance Distributed Computing (HPDC'03), 2003, IEEE, pp. 90-100.
European Patent Office, "International Preliminary Report on Patentability," Aug. 26, 2005, International Application No. PCT/US2004/026570, 9 pages..
International Searching Authority, "Notification of Transmittal of the International Search Report and the Written Opinion of the International Searching Authority, or the Declaration," Aug. 25, 2005, 12 pages.
Current Claims for International Application No. PCT/US2004/026445, pp. 1-5.
Henry Song, et al., "Browser State Repository Service," Lecture Notes in Computer Science, vol. 2414, 2002, pp. 1-14, XP002904339.
Eric Skow, et al., "A Security Architecture for Application Session Handoff," 2002, IEEE International Conference Proceedings, Apr. 28-May 2, 2002, vol. 1 of 5, pp. 2058-2063, XP010589848.
International Preliminary Examining Authority, "Written Opinion of the International Preliminary Examining Authority," Jun. 7, 2005, 4 pages.
Current Claims of International Application No. PCT/US04/26570, 4 pages.
Patent Cooperation Treaty, "Notification of Transmittal of the International Preliminary Report on Patentability," PCT/US2004/026405, dated Oct. 10, 2006, 7 pages.
Amended Claims, PCT/US2004/026405, dated Apr. 6, 2006, 4 pages (attached).
International Searching Authority, "Notification of the Transmittal of the International Search Report and Written Opinion of the International Searching Authority, or the Declaration," PCT/US2004/026506, dated Sep. 8, 2005, 12 pages.
Current Claims, PCT/US2004/026506, 9 pages.
Ravi Kokku et al., "Half-pipe Anchoring: An Efficient Technique for Multiple Connection Handoff," Proceedings 10$^{th}$ International Conference on Network Protocols, Nov. 12, 2002, XP010632563, 10 pages.
Ying-Dar Lin et al., "Direct Web Switch Routing with State Migration, TCP Masquerade, and Cookie Name Rewriting," Globecom 2003, IEEE Global Telecommunications Conference, Dec. 12003, IEEE, CP010677300, pp. 3663-3667.
International Searching Authority, "Notification of Transmittal of the International Search Report and the Written Opinion of the International Searching Authority, or the Declaration," Nov. 12, 2004, 13 pages.
Current Claims of International Application No. PCT/US2004/026570, 4 pages.
Current Claims of International Application No. PCT/US2004/025805, 8 pages.
International Searching Authority, "Notification of Transmittal of the International Search Report and the Written Opinion of the International Searching Authority, or the Declaration," dated Dec. 3, 2004, 12 pages.
International Searching Authority, "Notification of the Transmittal of the International Search Report and Written Opinion of the International Searching Authority, or the Declaration," PCT/US2005/025887, dated Feb. 6, 2006, 12 pages.
Current Claims, PCT/US2005/025887, 3 pages.
Chase, Jeffrey S., "Dynamic Virtual Clusters in a Grid Site Manger," Proceedings of the IEEE International Symposium on HPDC-2003, XP010463715, pp. 90-100.
International Searching Authority, "Notification of the Transmittal of the International Search Report and the Written Opinion of the International Searching Authority, or the Declaration", PCT/US2004/026405, dated Aug. 19, 2005, 5 pages.
Claims, PCT/US2004/026405, 7 pages.
"Office Action" received in U.S. Appl. No. 11/057,043 dated Apr. 9, 2008, 19 pages.
"Office Action" received in related case U.S. Appl. No. 10/917,687 filed Aug. 12, 2004, 9 pages.
"Office Action" received in related case U.S. Appl. No. 10/918,056 filed Aug. 12, 2004, 9 pages.
"Office Action" received in related case U.S. Appl. No. 10/917,687 filed Aug. 12, 2004, 9 pages.
Japanese Patent Office, "Notice of Grounds of Rejection", Patent application No. 523435-2006, English Translation, mailed Jun. 9, 2009, 2 pages.
Jeffrey S. Chase et al., "Dynamic Virtual Clusters In A Grid Site Manager", Jun. 22, 2003, 11 pages.

* cited by examiner

MANAGING WORKLOAD BY SERVICE

The present application claims priority to U.S. Provisional Application No. 60/495,368, Computer Resource Provisioning, filed on Aug. 14, 2003, which is incorporated herein by reference; the present application claims priority to U.S. Provisional Application No. 60/500,096, Service Based Workload Management and Measurement in a Distributed System, filed on Sep. 3, 2003, which is incorporated herein by reference.

The present application is related to the following U.S. applications:

U.S. application Ser. No. 10/917,660, Fast Application Notification In A Clustered Computing System filed by Carol Colrain on the equal day herewith and incorporated herein by reference.

U.S. application Ser. No. 10/917,663, Fast Reorganization Of Connections In Response To An Event In A Clustered Computing System, filed by Carol Colrain, et al. on the equal day herewith and incorporated herein by reference.

U.S. application Ser. No. 10/917,873, Hierarchical Management of the Dynamic Allocation of Resources in a Multi-Node System, filed by Benny Souder, et al. on the equal day herewith, and incorporated herein by reference;

U.S. application Ser. No. 10/917,953, Transparent Session Migration Across Servers, filed by Sanjay Kaluskar, et al. on the equal day herewith and incorporated herein by reference;

U.S. application Ser. No. 10/917,661, Calculation of Service Performance Grades in a Multi-Node Environment That Hosts the Services, filed by Lakshminarayanan Chidambaran, et al. on the equal day herewith and incorporated herein by reference;

U.S. application Ser. No. 10/918,055, Incremental Run-Time Session Balancing in a Multi-Node System filed by Lakshminarayanan Chidambaran, et al. on the equal day herewith and incorporated herein by reference;

U.S. application Ser. No. 10/918,056, Service Placement for Enforcing Performance and Availability Levels in a Multi-Node System, filed by Lakshminarayanan Chidambaran, et al. on the equal day herewith and incorporated herein by reference;

U.S. application Ser. No. 10/917,687, On Demand Node and Server Instance Allocation and De-Allocation, filed by Lakshminarayanan Chidambaran, et al. on the equal day herewith and incorporated herein by reference.

FIELD OF THE INVENTION

The present invention relates to measuring and managing workload using services, and in particular, workload within a multi-node computer system.

BACKGROUND OF THE INVENTION

Many enterprise data processing systems rely on multi-node database servers to store and manage data. Such enterprise data processing systems typically follow a multi-tier model that has a multi-node database server in the first tier, one or more computers in the middle tier linked to the database server via a network, and one or more computers in the outer tier.

A multi-node database server comprises multiple database instances running on a group of interconnected nodes managing access to a database. The nodes in the group may be in the form of computers (e.g. work stations, personal computers) interconnected via a network. Alternatively, the nodes may be the nodes of a grid, where each node is interconnected on a rack. The grid may host multiple multi-node database servers.

Enterprises monitor the performance of a multi-node database server to manage performance provided to the clients and users of the multi-node database server. To perform this function, information describing the workload placed on the resources of the multi-node database server is needed. Enterprise data processing systems generate such workload information.

An approach used for reporting workload information is the physical model approach. Under the physical model approach, workload information is demarcated by computers and components of computers that host a multi-node database server. For example, workload information is demarcated by node, database instance, and user session on a node.

Unfortunately, information provided under the physical model approach limits how performance of the multi-node database servers may be analyzed and managed. This limitation stems from the fact that workload information is delineated in a way that does not correlate well with the way it is being used by applications and browsers. For example, a business data processing system includes a multi-node database server, an online order entry application, accessible via the Internet, and other applications. The applications are executed by clients of the multi-node database server. To ensure customer satisfaction, the performance of the online order entry application is deemed critical. Computer resources should be allocated to the online order entry application in favor of the other applications.

Under the physical model approach, only information specific to the performance realized by a node, instance, and user session is available. Information about the specific performance realized for the online order entry system and other applications cannot be identified and measured. It is possible that workload information indicates that the performance of a node or database instance is good while performance realized for work performed for the online order entry application is in fact bad. Similarly, it is possible that workload information indicates that the performance of a node, database instance, and the online order entry application is good while performance experienced by the other applications is bad.

Based on the foregoing, there is clearly a need for an approach for managing and measuring workload information in a way not limited to physical components of the individual computer resources, and in a way that more closely correlates with the way resources are being used.

Approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for measuring and managing workload in single or multi-node environment is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are approaches for managing and measuring workload on computer resources by measuring workload in ways that are independent of physical hardware and that correlate to ways in which it is desirable to measure and manage workload for applications and clients. Specifically, logical abstractions of workload, referred to as services, are defined for a cluster of nodes running a multi-node database server of a database. A service is a category of work that may be executed by any number of nodes in a multi-node system, such as work that is performed for an online order entry application. The workload is demarcated and delineated by the service no matter which node in a single or multi-node system performs the service, and can provide a global and location transparent view of performance realized by the system.

The approaches provide information that enables powerful ways of managing performance. Real-time information is generated about performance achieved for a service on particular nodes. In an embodiment, these are compared to quality of service requirements prescribed for the service. If the quality of service requirements for a service are being violated on a node, work for the service can be shifted to another node where quality of service realized for the service is better. The information is used to migrate sessions between nodes and/or instances, or to route incoming connection or work requests to a particular node and/or instance.

Illustrative Distributed System

Figure 1:
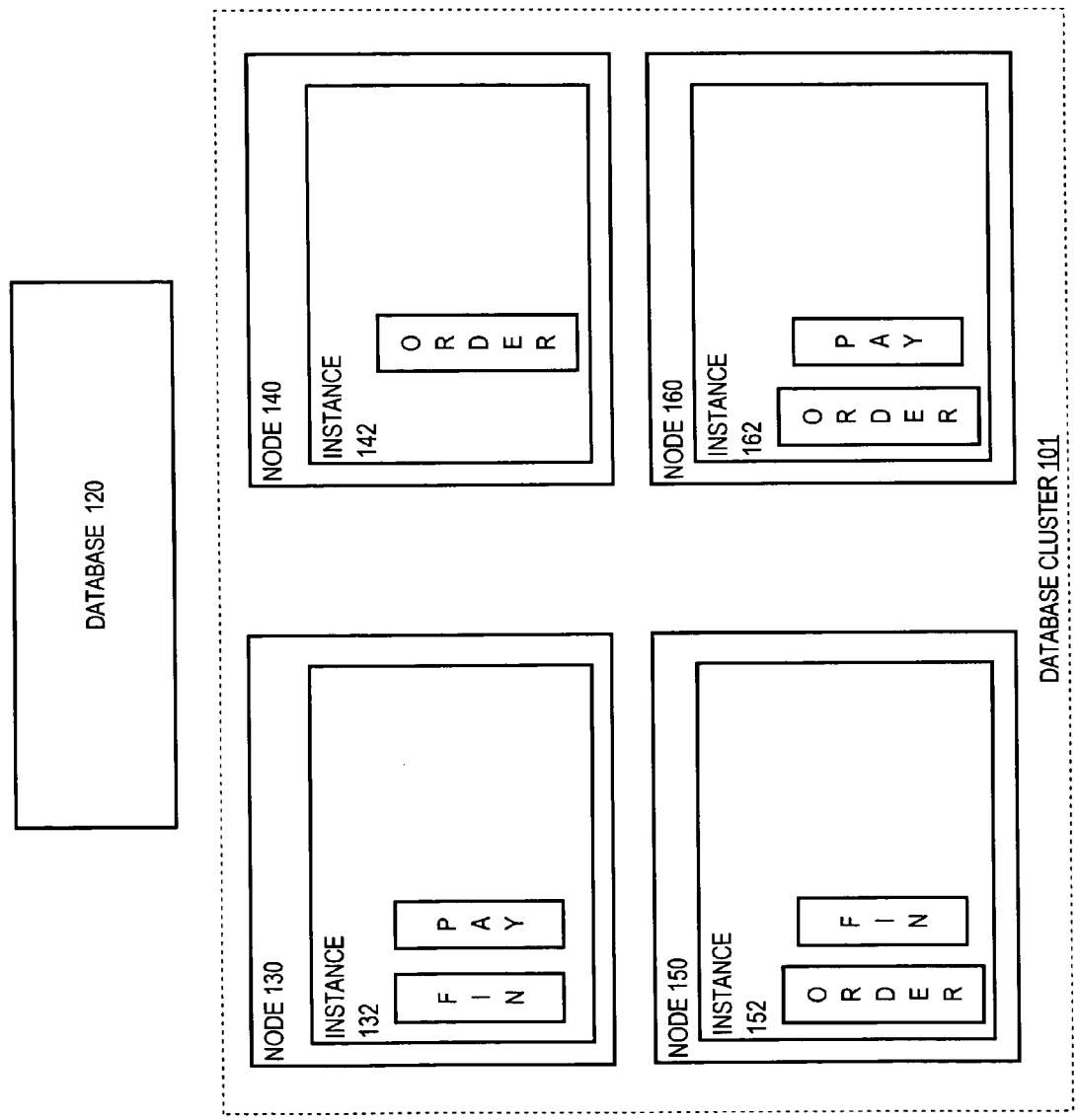
FIG. 1 is a block diagram showing a distributed computer system on which an embodiment of the present invention may be implemented.

FIG. 1 shows a distributed computer system that may be used to implement an embodiment of the present invention. Referring to FIG. 1, it shows database cluster 101. A database cluster is a set of nodes that host a multi-node database server that manages access to a particular database. The nodes in database cluster 101 may be in the form of computers (e.g. work stations, personal computers) interconnected via a network, and may be part of a grid.

A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. Resources from multiple nodes in a distributed computer system can be allocated to running a particular server's software. A particular combination of the software on a node and the allocation of the resources from the node is a server that is referred to herein as a server instance or instance. Thus, a distributed server comprises multiple server instances that can run on multiple nodes. Several instances of a distributed server can even run on the same node.

A database server governs and facilitates access to a particular database, processing requests by clients to access the database. A multi-node database server comprises multiple "database instances", each database instance running on a node, and governing and facilitating access to one or more databases. A multi-node database server that governs and facilitates access to a particular database may be referred to herein as a multi-node database server. Database instances 132, 142, 152, and 162 thus comprise a multi-node database server. In another example, the database instances on a multi-node database server may access separate databases.

Clients that connect to a database server, directly or through another computer, to access the database managed by the database server, are referred to herein as clients of the database. For example, a process on a computer not part of database cluster 101 executes an application and is connected to database cluster 101 to access database 120. The process is referred to herein as a client of database 120. The process may also be referred to as connected to the database 120.

An application, as the term is used herein, is a unit of software that is configured to interact with and use the functions of a server. In general, applications are comprised of integrated functions and software modules (e.g. programs comprised of machine executable code or interpretable code, dynamically linked libraries) that perform a set of related functions.

For purposes of exposition, software modules, such as an application or database server software, are described herein as performing particular actions, when in fact execution of the software by a process causes the process to perform those actions. For example, when an application is described as transmitting or receiving a message or accessing data, a process executing the application is transmitting or receiving the message or accessing the data.

An application may interact with multi-node database server 101 via a client-side interface that resides on the same computer system of the application. Such an application includes invocations of routines (e.g. functions, procedures, object methods, remote procedures) of a client-side interface. An example of a client-side interface component is the Oracle Call Interface ("OCI"), available from Oracle Corporation, or Java Database Components ("JDBC"), also available from Oracle Corporation. Services A service is work of a particular type or category, where the work is hosted on one or more servers. Services are associated with attributes, which include a quality of service that is prescribed for the particular type or category of work. The quality of service can include performance requirements, such as response time or velocity (described later), priority, a preferred topology, and a minimum and/or maximum instance cardinality that may host a service. The work performed as part of a service includes any use or expenditure of computer resources, including, for example, CPU processing time, storing and accessing data in volatile memory, read and writes from and/or to persistent storage (i.e. disk space), and use of network or bus bandwidth.

Database instances of a database cluster are allocated to performing one or more services. When a database instance (or node) is allocated to perform a service, the database instance is referred to herein as hosting, running, or providing the service, and the service is referred to herein as running or being placed on the database instance.

Database instance 132 hosts services FIN and PAY, database instance 142 hosts service ORDER, database instance 152 hosts services ORDER and FIN, and database instance 162 hosts services ORDER and PAY. The FIN service is work performed by database instances 132 and 152 for a financial application. Typically, this service involves accessing database objects on database 120 that store database data for a financial application. The PAY service is work performed by database instances 132 and 162 for a payroll application. Typically, this service involves accessing database objects on database 120 that store database data for the payroll application. The ORDER service is work performed by database instances 142, 152, and 162 for an online ordering application for online ordering over the Internet. Typically, this service involves accessing database objects on database 120 that store database data for online ordering applications.

According to an embodiment, a service can be mapped to a database schema. This allows rolling application upgrades by service.

Services may be further subdivided into any number and levels of sub-categories. According to an embodiment of the present invention, services may be broken down into two hierarchical levels of service subcategories. The subcategory at the first level is referred to as a module. The subcategory at the second level is referred to as an action, which is a subcategory within a module. A module may correspond to, for example, a software or functional module within the payroll application, such as module Generate Paychecks, and an action may correspond to an action performed by the module Generate Paychecks, such as Post Paychecks. A service may be broken down into any number of modules, and a module may be broken down into any number of actions.

Service Attributes

A service and its various attributes and quality of service need to be defined. According to an embodiment, a database server provides a command line interface that accepts commands from human administrators to create and modify definitions for services of a database server. The definitions are stored as database configuration data in a dictionary in database 120 as a "service profile".

Figure 2:
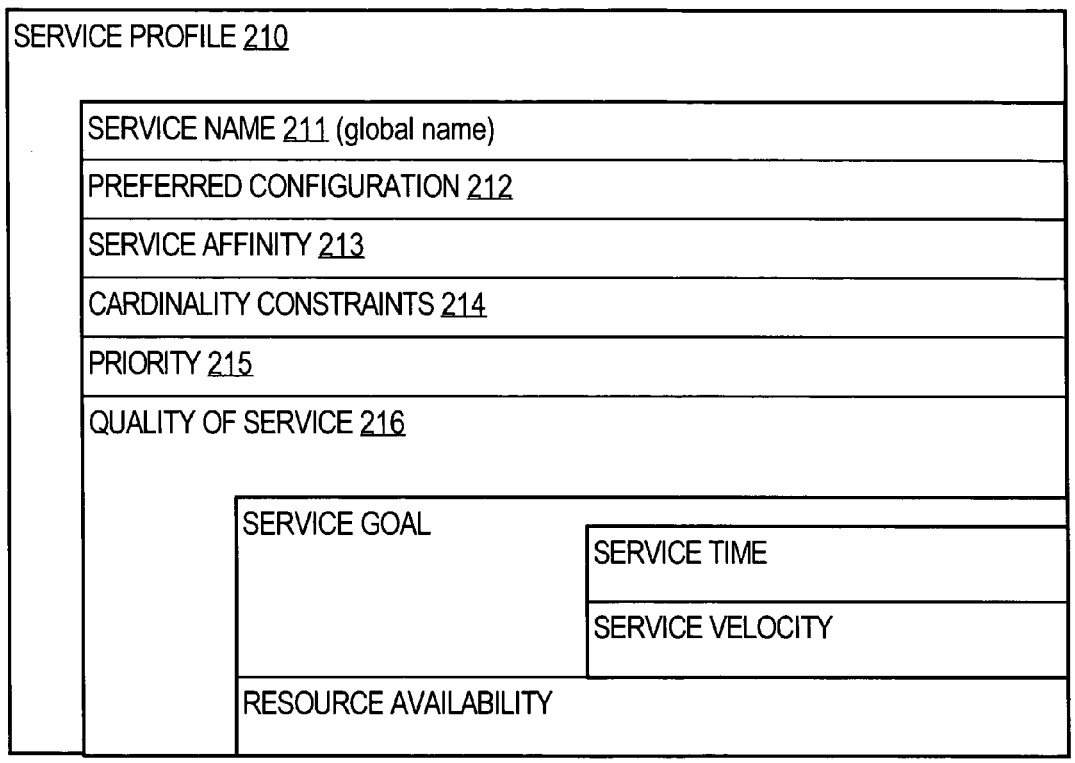
FIG. 2 is a block diagram depicting a service profile defining a service according to an embodiment of the present invention.

FIG. 2 is a block diagram depicting service profile 210, a service profile according to an embodiment of the present invention. Service profile 210 defines various dimensions and attributes of a service. Service name 211 specifies a global name for the service, a name that uniquely identifies the service within database cluster 101, a grid, or a given multi-node computer system. Preferred configuration 212 defines a preferred configuration of a database instance or node on which the service is placed, and identifies one or more preferred instances on which to place a service when a service is initially placed within a database cluster, placed to another database instance during recovery processing, or placed and expanded to another database instance to allocate another database instance for the service. Preferred configuration also specifies service placement restrictions, i.e. instances which preferably should not host the service. Service affinity 213 identifies one or more services within which a service performs better when placed on the same node or database instance. Service affinity may be derived from performance statistics and metrics maintained for each service. Performance statistics and metrics shall be described in greater detail later.

Cardinality Constraints 214 specifies the minimum or maximum number of resources to allocate to a service, such as the minimum and maximum number of instances that should host a server.

Priority 215 specifies a priority relative to other services when allocating resources, particularly when there are insufficient resources to meet performance requirements of all of a set of services.

Quality of Service 216 specifies quality of service requirements for the service. Examples of quality of service requirements include:

Service-Level Goal. A service level goal is a desired service time or service velocity.

Service time: is the elapsed time for an instance to process a call or request for a service. Normalized service time is a measure of the elapsed time (to process a call or request) versus the demand. This measure is directly comparable across instances and nodes. The normalized service time is defined as a quotient based on performance metrics, as follows.

Let $SN(S, I, D)$ be the normalized response time for service S at instance I for interval D, and Service time$(S,I,D)$ be elapsed time per call for service S at instance I for interval D, and user calls$(S, I, D)$ be the calls for service S at instance I for interval D.

$$SN(S, I, D) = \text{Service time}(S, I, D)/\text{User calls}(S, I, D)$$

Service Velocity: Service velocity is expressed as the amount of time that needed resources are available when the service requires them per unit time. Velocity is not a measure of the quality of the work being done, it is a measure of how much of the time resources needed by a service are available to it. Velocity represents, for example, the rate at which a request or call for a service is "given" resource CPU processing time.

Let $V(S, I, D)$ be the velocity for service S at instance I for interval D $$V(S, I, D) = \text{CPU Used}/\text{Service Time, where CPU used is the percent CPU by the service for interval } D.$$

A call is a request from a client to perform a task, such as executing a database statement. A call can be commenced by invoking, for example, a function of a client-side interface, such as the Oracle Call Interface.

Resource Availability: The minimum number of resources to allocate to a service, such as a minimum number of instances that should host a server.

Sessions Established for Clients by a Listener

In order for a client to interact with a database server on database cluster 101, a session is established for the client. A session, such as a database session, is a particular connection established for a client to a server, such as a database instance, through which the client issues a series of requests (e.g., requests for execution of database statements). For each database session established on a database instance, session state data is maintained that reflects the current state of a database session. Such information contains, for example, the identity of the client for which the session is established, a service used by the client, and temporary variable values generated by processes executing software within the database session.

A client may establish a database session by transmitting a database connection request to database cluster 101. A listener receives the database connection request. A listener is a process running on database cluster 101 that receives client database connection requests and directs them to a database instance within database cluster 101. The client connection requests received are associated with a service. The client request is routed to a database instance hosting the service, where a database session is established for the client. The instance is selected in a way that accounts for the quality of service requirement for the service and workload balancing, as shall be described in greater detail.

Once the database session is established for the client, the client may issue additional requests, which may be in the form of function or remote procedure invocations, and which include requests to begin execution of a transaction, to execute queries, to perform updates and other types of transaction operations, to commit or otherwise terminate a transaction, and to terminate a database session.

In an embodiment of the present invention, a connection pool manager manages pools of connections to database instances. The connection pool manager operates in the middle-tier between clients of database 120 and database cluster 101. Such a connection pool manager is described in Fast Application Notification In A Clustered Computing System (50277-2540). The pools are associated with and allocated to services. To create a connection within a pool for a service, the connection pool manager transmits a database connection request to database cluster 101, specifying the service for which the connection is to be established. When a database connection request from the connection manager for a service is received by the listener on database cluster 101, the listener directs the request to a database instance hosting the service, where a database session is established. The connections in a connection pool, once established, are borrowed by database clients when they request work, such as the computation of a query, based on a service associated with the database client. The connection to an instance is selected in a way that accounts for the quality of service requirement for the service and workload balancing, as shall be described in greater detail. When the work requested is completed, a database session borrowed by a database client is returned to the pool.

Connection-time and Run-time Balancing

Connection-time and run-time balancing are used to balance workload between database instances of database cluster 101. Under connection-time balancing, connections are distributed at connection-time, when a database session for a client is created. Specifically, when a client requests to establish a database session on a multi-node database server, the session is placed on an instance or node based on work load considerations. Connections should be established relatively infrequently, and thus connection load balancing should use metrics that do not vary over time.

Runtime load balancing is used whenever a connection is assigned from a connection pool for a work request. This can be a very frequent activity. Runtime load balancing should be sensitive to the current performance of services across the system, particularly work request of short duration.

Generating Performance Metrics

Performance metrics are data that indicates the quality of service realized by services for one or more resources. A performance metric of a particular type that can be used to gauge a characteristic or condition that indicates a quality of service is referred to herein as a performance measure. A performance measure includes for example, average transaction execution time for a service, and percent CPU used for a service, service time, service velocity, and performance grades. A performance grade is a value or set of values that indicates the relative work performance offered by a resource, such as a database instance or node, relative to other resources, and shall be later described.

A background process generates performance metrics from performance statistics that are generated for each session and service hosted on a database instance. Like performance metrics, performance statistics can indicate a quality of performance. However, performance statistics, in general, include more detailed information about specific uses of specific resources. Performance statistics include, for example, how much time CPU time was used by a session, the velocity of a call, the number of calls a session made, the response time required to complete the calls for a session, how much CPU processing time was used to parse queries for the session, how much CPU processing time was used to execute queries, how many logical and physical reads were performed for the session, and wait times for input and output operations to various resources, such as wait times to read or write to a particular set of data blocks. Performance statistics generated for a session are aggregated by services and service subcategories (e.g. module, action) associated with the session.

Performance Grades

The performance grade associated with an instance is used to select the optimal instance to receive work. Based on the service goal for a service—service time or velocity—the respective performance metric is used as the service goodness. Goodness, as the term is used herein, reflects the ability of a node and instance to process work for the service.

For example, when the service goal is service time, service goodness describes the service delivery versus demand. For example, service is processed at 0.1 s per call when there are 2000 user calls. When the service goal is velocity, the goodness describes the availability of resources at the node to serve the service.

According to an embodiment, a performance grade comprises four values—service goodness value, service flags, service delta, and service percent, as described further below.

Service Goodness Value

The service goodness is a measure of the attractiveness of an instance to provide service. Performance metrics are maintained for service time ("service time goodness value") and service velocity ("service velocity goodness value") as moving averages of service time per call and velocity of CPU per service, for each service at each instance. Being normalized values, the goodness values reflect the relative ability of the instance to deliver service. A service time goodness value is a weighted average of service time by calls, i.e. work delivered versus work demanded. A service velocity goodness value is a measure of the rate at which the CPU is completing work for the service. When the goal for a service is service time, moving average over an interval of time (e.g. 3 minutes, 5 minutes) is used as a service time goodness value. Lower values reflect better service time goodness. When the goal for a service is service velocity, moving average of service velocity over an interval is used as a service velocity goodness value. Higher values represent better service velocity goodness. Preferably, runtime load balancing uses service velocity goodness values.

Service Goodness Flags

The service flags are enumerated values relevant to quality of service at an instance, as follows.

GOOD: The service goal for a service is being meet at a node.

VIOLATING: This value reflects that a service goal for a service is not being met.

UNKNOWN: Indicates performance metrics for computing the service goodness are not available yet.

NO DATA: This value indicates that an instance is unable to provide service goodness values or service goodness percents, due to, for example, system failure on a node.

BLOCKED: Specifies that work for a service is blocked from the instance.

Service Goodness Percent

The ratio of the response time goodness values, and similarly the velocity values, is a direct comparison of the attractiveness of an instance for a service relative to the other instances supporting that service. Service goodness percent is used to determine the portion of work to route to the instances. For example, let the moving averages of the response times for instance one, two and three be 0.25 s, 0.1 s, 0.4 s. This indicates that the percentage of work to route to each instance is 25%, 60%, and 15% respectively.

Service Delta Value

The service delta value describes the contribution of each session to the service goodness. Between updates to the goodness values at the client, the current goodness value can be adjusted using the service delta value.

Metrics to Use for Connection-time and Run-time Load Balancing.

As mentioned, preferably connection-time balancing should depend on metrics that do not vary widely during the lifetime of a connection. According to an embodiment, the following metrics can be used by a listener to select the best instance to route a database connection request, as follows:

Session count by instance: For services that span instances uniformly on nodes with similar capacity, balancing to maintain a uniform session count evenly distributes the workload of sessions across the nodes.

Run queue length of the node—A run queue is a queue of processes waiting for CPU use. Run queue length is the number of processes in the run queue. For services that use a subset of instances in a database cluster or multi-node system and different capacity nodes, run queue length places more sessions on the node with least load at the time of connection creation.

Performance grades—For all services using all or a subset of instances in a database cluster with different priorities and different capacity nodes, the performance grades reflect a relative ranking of the quality of service experienced at an instance. Work requests can be routed to instances with better performance grades, and/or in proportion to service goodness percent.

Weighted session count by service—For all services using all or a subset of instances in a database cluster with different priorities and different capacity nodes, the weighted session count by service is a ranking of the power of the node to serve that service. The weighting compares the session count for the service to the nodes computing power and accounts for service placement restrictions regarding instances.

Run-time load balancing, as mentioned before, is preferably sensitive to the current performance of services across the system. Performance grades are thus preferably used.

Generating Service Based Metrics

Figure 3:
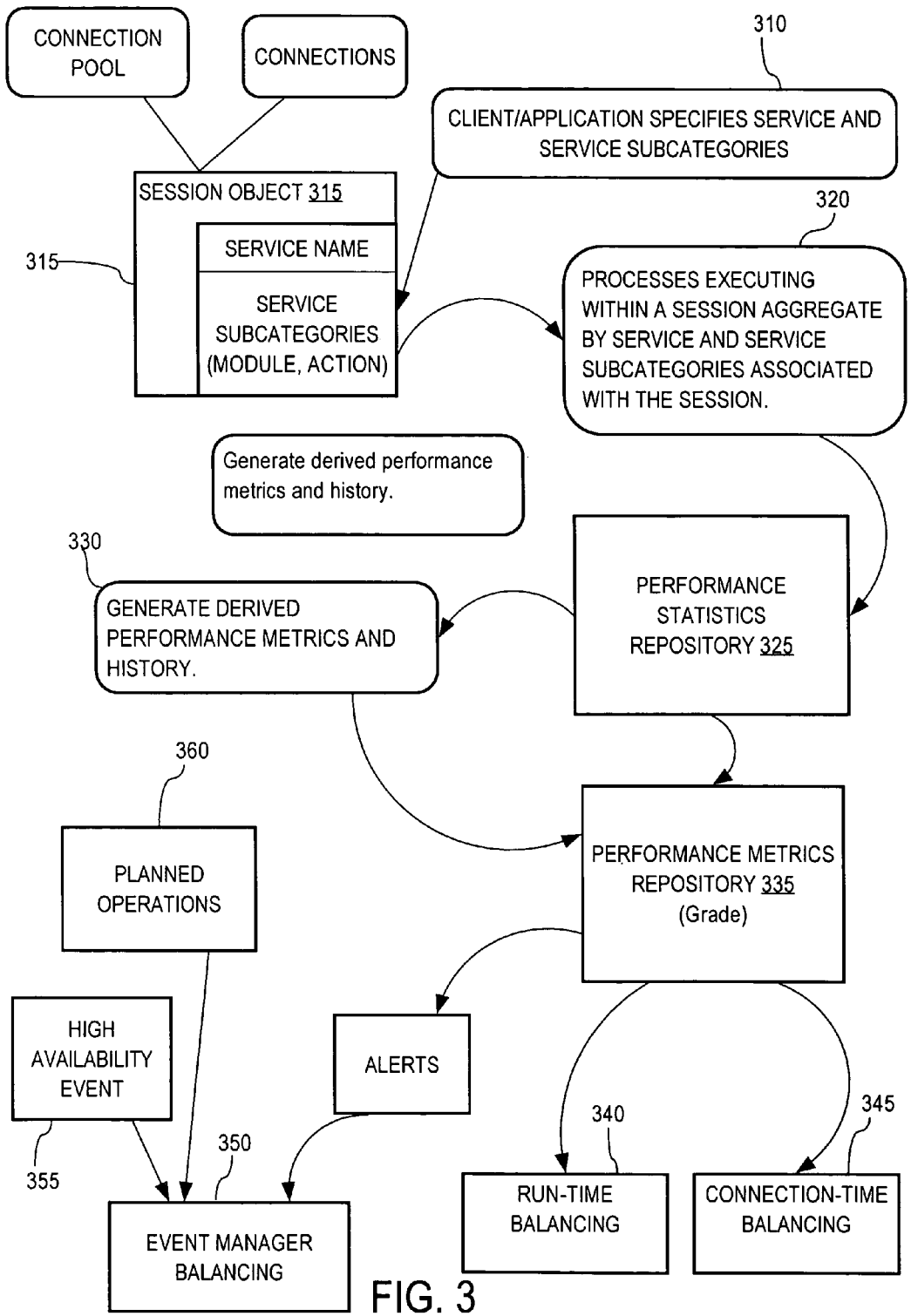
FIG. 3 is a work flow diagram showing how service-based performance metrics are generated and used according to an embodiment of the present invention.

FIG. 3 is a work flow diagram showing how performance statistics and metrics for measuring quality of service are generated and used according to an embodiment of the present invention.

Referring to FIG. 3, for each session established on a database instance, a session object 315 is created as part of establishing the session on the database instance. A session object contains items of information used by a database instance to manage a session. Among these items of information are a service identifier and service subcategories (e.g. module, action) defined for the session. In an embodiment, the service id is a hash value generated from the service name of the service.

The client and/or application for which the session is established may specify in various ways a service and service subcategories to associate with the session 310. A database connection request issued by or for the client can include a string that specifies a service. To establish the session in response to the request, the database instance follows security procedures to ensure that the client of the connection request is authorized to use the service requested. Once the connection and session is established for a client, the session is associated with the service. An application may then dynamically set and change service subcategories.

In an embodiment, an application sets or changes the service subcategories by setting user context attributes that store the service subcategories. A user context is data that is maintained by a database server and that is associated by the database server with the database session. An application accesses and changes a user context through an Application Programmer Interface ("API") provided by the database server. A user context contains various attributes, such as a user id identifying the user associated with the session. In addition, user context attributes hold service subcategories that specify a module and action for a session.

Performance statistics are generated and aggregated by processes performing work requested within a session. (320) When work for a session is performed in this way, the session may be referred to herein as performing the work. For example, a database session is established for a client. The client borrows a database session from a session pool and transmits a request to execute a query via the connection established for the database session. The session, executing the database server software, parses the query and formulates an execution plan for computing the query in parallel. The database server software that parses the database query, formulates the execution plan and computes the query also generates and aggregates performance statistics. The database server software aggregates the performance statistics by session, service of the session, and by the service subcategories of the session. The performance statistics are stored in performance statistics repository 325. Statistics repository 325 is, for example, an in-memory fixed table that is associated with a session or that is associated with a service disconnected from any session. Performance statistics for a session are aggregated and stored within an in-memory table for the session. Performance statistics for the service are aggregated and stored within the in-memory table for the service. Separate tables are similarly used for aggregating and storing performance statistics by module and action.

For example, a session is associated with the service PAY, the module for generating paychecks, and the action for posting pay checks. To compute a query, a database process assigned to the session uses 0.4 seconds of CPU time. The process adds 0.4 to the subtotals in the in-memory table for service PAY, and to subtotals in the in-memory tables for both module Generate Paychecks and action Post Checks.

Periodically, (e.g. every 5 seconds) a workload monitor accesses the performance statistics repository 325 to generate performance metrics (330) and stores the generated performance metrics in performance metrics repository 335. Performance metrics repository 335 is preferably an in-memory database table. The in-memory performance metrics are used for both run-time balancing (345) and connect-time balancing (340). New work is distributed based on the performance metrics and quality of service requirements.

For example, a workload monitor may every five seconds access performance statistics repository 325 to generate performance metrics, including performance grades. The performance grades are transmitted to a listener for connection-time balancing or to a connection pool manager in the middle tier for run-time load balancing. The listener uses the performance grades to perform connection-time balancing, establishing sessions for connection requests to services on database instances offering superior performance for the services. (see U.S. application Ser. No. 10/917,873, Hierarchical Management of the Dynamic Allocation of Resources in a Multi-Node System (50277-2382). The connection manager uses the performance grades to perform connection-time balancing.

A workload monitor can also compare performance metrics as they are generated for quality of service thresholds to detect violations of the quality of service requirements. When a performance violation for a service is detected, the workload monitor sends messages to alert an event manager responsible for performing workload balancing in response to various events (350), such as the alerts. For example, to remedy the violation of a quality of service requirement, an event manager shifts workload between nodes, database instances, or resources. To find a node to which to send workload, the alerted event manager accesses performance metrics to determine what database instance, node, or computer resource may accept additional workload of a service without violating quality of service requirements. (see, for example, Hierarchical Management of the Dynamic Allocation of Resources in a Multi-Node System (50277-2382), Incremental Run-Time Session Balancing in a Multi-Node System (50277-2411), Service Placement for Enforcing Performance and Availability Levels in a Multi-Node System (50277-2412), and On Demand Node and Server Instance Allocation and De-Allocation (50277-2413)). The event manager may shift workload to respond to a high availability event (355) (failure of instance or node) or planned operation (360) (e.g. taking down a node for scheduled maintenance). Each of these events may require placing a service on another instance to meet an availability requirement. The selection may be based on performance metrics and quality of service requirements.

Alternatively, the performance metrics may be reviewed pro-actively (e.g. every 30 seconds) without having to be alerted. Workload is shifted based on a comparison of performance metrics and quality of service requirements.

Tracing Services

Tracing provides a very detailed level of performance and resource usage information. Tracing can be enabled to trace and diagnosis activities of a service at, for example, the module or action level and/or a call-by-call basis. Detailed tracing of work can consume an undesirable amount of processing time and storage space to store the information generated. In an embodiment of the present invention, the levels of service subcategories at which a database server generates performance statistics and persistently retains the information may be configured. Tracing may be enabled for a particular service by a human administrator through a command line interface through which commands may be entered.

The ability to configure tracing and turn it on or off for specific service and service subcategories allows administrators to diagnose problems in detail. Finally, tracing may be enabled for a service on all nodes within a database cluster. This provides a global view of the performance of a service on a database cluster.

Alternative Computing Environment

An embodiment of the present invention has been illustrated by measuring workload and performance realized by services provided by database servers. However, the present invention is not so limited.

For example, an embodiment of the present invention may be used to allocate computer resources of a multi-node system that hosts an application server among services provided by the application server. An application server is part of, for example, a three tier architecture in which an application server sits between clients and a database server. The application server is used primarily for storing, providing access to, and executing application code, while a database server is used primarily for storing and providing access to a database for the application server. The application server transmits requests for data to the database server. The requests may be generated by an application server in response to executing the application code stored on the application server. An example of an application server is Oracle 9i Application Server or Oracle 10g Application Server. Similar to examples of a distributed server described herein, an application server may be distributed as multiple server instances executing on multiple nodes, the server instances hosting multiple sessions.

The present invention is also not limited to homogenous distributed servers comprised only of server instances that execute copies of the same software product or same version of a software product. For example, a multi-node database server may be comprised of several groups of server instances, each group executing a different database server software from a different vendor, or executing a different version of database server software from the same vendor.

HARDWARE OVERVIEW

Figure 4:
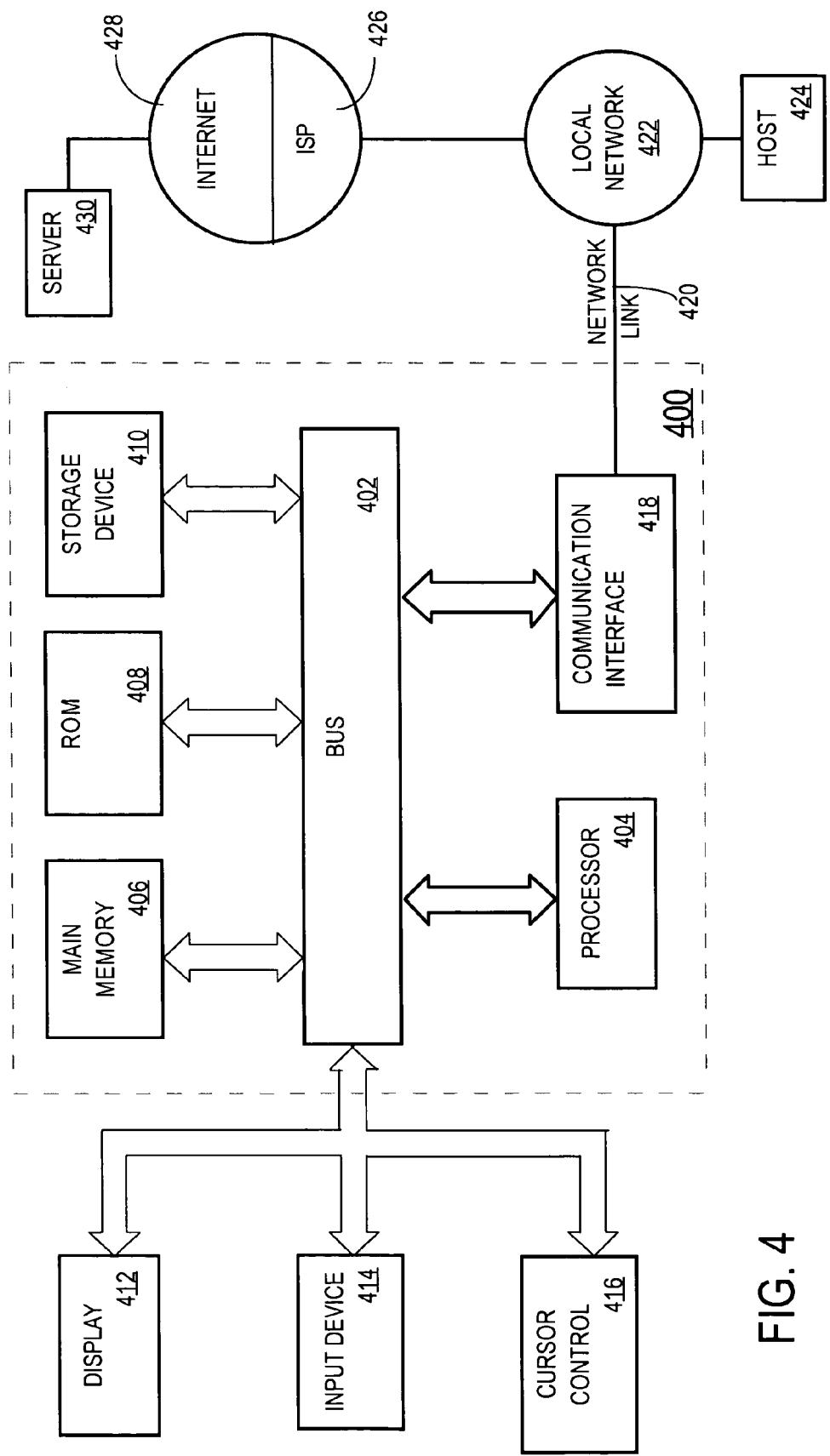
FIG. 4 is a block diagram of a computer system that may be used in an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for generating information that measures workload in a multi-node system, comprising:
    a server receiving user input that defines categories of work that can be performed by a plurality of nodes in the multi-node system;
    said server generating and storing first data that defines said categories of work based on said user input;
    said server aggregating performance statistics according to said categories of work defined by said first data;
    each node in the plurality of nodes generating second data, based on said aggregated performance statistics, that includes at least one performance metric that indicates a quality of service for work performed by the node for each category of said categories;
    generating performance grades for said each category of said categories, wherein each performance grade of said performance grades indicates a quality of performance realized for said each category of work on a node relative to other nodes within said multi-node system;
    said user input further specifying at least one quality of service requirement for said each category of said categories;
    wherein the at least one quality of service requirement is based on at least one of:
        a) percent of CPU allocated to performing work for said each category during a time interval; or
        b) average elapsed time to execute one or more requests for work of said each category; and
    wherein the steps of the method are performed by one or more computing devices.

2. The method of claim 1, wherein:
    based on said second data, determining that a quality of service requirement for a certain category is being violated; and in response to determining that said quality of service requirement is being violated, transmitting a message indicating that said quality of service requirement is being violated.

3. The method of claim 2, wherein the at least one quality of service requirement is based on the percent of CPU allocated to performing work for said each category during a time interval.

4. The method of claim 1, further including:
receiving second user input;
in response to receiving said second user input, generating third data;
wherein generating said second data includes generating said third data that reflects a quality of performance realized for certain work performed on a node for subcategories of at least one category of said categories; and
wherein the certain work performed includes certain work of the categories of work performed in response to requests from a client, wherein the client specifies said subcategories within which the certain work for the requests is performed.

5. The method of claim 4, wherein said subcategories include a module and an action;
wherein the module is a component of an application, wherein the module performs one or more actions, and the action is a subcategory of said module.

6. The method of claim 4, further including:
receiving third user input; and
in response to receiving said third user input, ceasing to generate said third data.

7. The method of claim 1, wherein:
said each node of the plurality of nodes hosts a database server that manages access to a database; and
wherein the database server performs generating said second data; and
wherein storing said first data includes storing said first data in said database.

8. The method of claim 7, wherein said each node in the plurality of nodes generating said second data includes generating data that reflects a quality of performance for work performed by a database instance of a database server for a category of said categories.

9. The method of claim 1, wherein said user input specifies one or more of:
a) server instances that should not host said categories of work; and
b) other categories of work, which when performed on a common server instance, cause said categories of work to perform better.

10. The method of claim 1, wherein:
the method includes establishing a session associated with a user on a node of said plurality of nodes;
the method includes generating third data that specifies a category of said categories that is associated with said session; and
the step of generating second data includes aggregating data, that indicates quality of service realized for said session, according to the category specified by said third data.

11. A computer-readable volatile or non-volatile storage medium storing instructions which, when executed by one or more processors, cause the one or more processors to perform:
a server receiving user input that defines categories of work that can be performed by a plurality of nodes in a multi-node system;
said server generating and storing first data that defines said categories of work based on said user input;
said server aggregating performance statistics according to said categories of work defined by said first data;
each node in the plurality of nodes generating second data, based on said aggregated performance statistics, that includes at least one performance metric that indicates a quality of service for work performed by the node for each category of said categories;
generating performance grades for a certain category of said categories, wherein each performance grade of said performance grades indicates a quality of performance realized for said certain category of work on a node relative to other nodes within said multi-node system; and
said user input further specifying at least one quality of service requirement for said each category of said categories;
wherein the at least one quality of service requirement is based on at least one of:
a) percent of CPU allocated to performing work for said each category during a time interval; or
b) average elapsed time to execute one or more requests for work of said each category.

12. The computer-readable volatile or non-volatile storage medium of claim 11 wherein:
based on said second data, determining that a quality of service requirement for a certain category is being violated; and
in response to determining that said quality of service requirement is being violated, transmitting a message indicating that said quality of service requirement is being violated.

13. The computer-readable volatile or non-volatile storage medium of claim 12,
wherein the at least one quality of service requirement is based on the percent of CPU allocated to performing work for said each category during a time interval.
aggregating data, that indicates the quality of service realized for said session, according to the certain category specified by said third data.

14. The computer-readable volatile or non-volatile storage medium of claim 11, said instructions further comprising instructions that cause the one or more processors to perform:
receiving second user input;
in response to receiving said second user input, generating third data;
wherein generating said second data includes generating said third data that reflects a quality of performance for certain work performed on a node for subcategories of at least one category of said categories; and
wherein the certain work performed includes certain work of the categories of work performed in response to requests from a client, wherein the client specifies said subcategories within which the certain work for the requests is performed.

15. The computer-readable volatile or non-volatile storage medium of claim 14, said instructions further comprising instructions that cause the one or more processors to perform:
receiving third user input; and
in response to receiving said third user input, ceasing to generate said third data.

16. The computer-readable volatile or non-volatile storage medium of claim 14, wherein said subcategories include a module and an action;

wherein the module is a component of an application, wherein the module performs one or more actions, and the action is a subcategory of said module.

17. The computer-readable volatile or non-volatile storage medium of claim 11, wherein said each node of the plurality of nodes hosts a database server that manages access to a database;

wherein the database server performs generating said second data; and wherein storing first data includes storing first data in said database.

18. The computer-readable volatile or non-volatile storage medium of claim 17, wherein said each node in the plurality of nodes generating said second data includes generating data that reflects a quality of performance for work performed by a database instance of a database server for a category of said categories.

19. The computer-readable volatile or non-volatile storage medium of claim 11, wherein said user input specifies one or more of:

a) server instances that should not host said categories of work; and b) other categories of work, which when performed on the same server instance, cause said categories of work to perform better.

20. The computer-readable volatile or non-volatile storage medium of claim 11, wherein:

the method includes establishing a session associated with a user on a node of said plurality of nodes;

the method includes generating third data that specifies a category of said categories that is associated with said session; and the step of generating second data includes aggregating data, that indicates quality of service realized for said session, according to the category specified by said third data.

* * * * *

UNITED STATES PATENT AND TRADEMARK OFFICE
CERTIFICATE OF CORRECTION

PATENT NO. : 7,664,847 B2
APPLICATION NO. : 10/917715
DATED : February 16, 2010
INVENTOR(S) : Carol Colrain et al.

It is certified that error appears in the above-identified patent and that said Letters Patent is hereby corrected as shown below:

On page 3, in column 1, under "Foreign Patent Documents", line 17, insert -- WO WO 00/10084 A 02/2000. --.

On page 3, in column 1, under "Other Publications", line 9, delete "pages.." and insert -- pages. --, therefor.

On page 3, in column 2, under "Other Publications", line 10, delete "12003," and insert -- 1, 2003, --, therefor.

On page 3, in column 2, under "Other Publications", line 39, delete "10/917,687" and insert -- 10/917,661 --, therefor.

In column 1, line 16, delete "reference." and insert -- reference; --, therefor.

In column 1, line 20, delete "reference." and insert -- reference; --, therefor.

In column 4, line 46, delete "Services" and insert the same on col. 4, line 47, below "Corporation.".

In column 6, line 18, delete "time(S,I,D)" and insert -- time(S, I, D) --, therefor.

In column 6, line 32, below "time." insert -- Service Velocity is based on a normalized service time. Service velocity is defined as a quotient based on performance metrics, as follows. --, as a new paragraph.

In column 10, line 24, delete "session. (320)" and insert -- session (320). --, therefor.

In column 11, line 6, delete "(see" and insert -- (See --, therefor.

In column 15, line 33, in claim 7, delete "database; and" and insert -- database; --, therefor.

Signed and Sealed this

Twenty-eighth Day of September, 2010

David J. Kappos
*Director of the United States Patent and Trademark Office*

CERTIFICATE OF CORRECTION (continued)
U.S. Pat. No. 7,664,847 B2

In column 16, line 39-42, in claim 13, after "interval." delete "aggregating data, that indicates the quality of service realized for said session, according to the certain category specified by said third data.".